US005306544A

United States Patent [19]

Pommeranz et al.

[11] Patent Number: 5,306,544

[45] Date of Patent: Apr. 26, 1994

[54] PLASTIC COATED PAPER WEB FOR TRAYMATS AND COASTERS

[75] Inventors: Winfried Pommeranz, Enger; Manfred Korn, Kleve, both of Fed. Rep. of Germany

[73] Assignee: Eul & Guenther GmbH & Co. KG, Emmerich, Fed. Rep. of Germany

[21] Appl. No.: 17,629

[22] Filed: Feb. 12, 1993

Related U.S. Application Data

[63] Continuation-in-part of Ser. No. 692,169, Apr. 26, 1991, abandoned.

[30] Foreign Application Priority Data

Apr. 26, 1990 [DE] Fed. Rep. of Germany ....... 3911912

[51] Int. Cl.[5] ................................................ B32B 3/00

[52] U.S. Cl. .................................... 428/195; 428/511; 428/537.5; 428/141; 428/143; 428/207; 428/211; 428/327; 428/339; 428/423.1

[58] Field of Search ..................... 428/537.5, 141, 143, 428/207, 211, 327, 339, 423.1, 511, 195

[56] References Cited

U.S. PATENT DOCUMENTS

| | | | |
|---|---|---|---|
| 3,864,181 | 2/1975 | Wolinski et al. | 156/79 |
| 4,137,356 | 1/1979 | Shoemaker et al. | 428/211 |
| 4,277,529 | 7/1981 | Friedman | 428/211 |
| 4,457,964 | 7/1984 | Kaminstein | 428/43 |
| 5,057,366 | 10/1991 | Husman et al. | 428/355 |

*Primary Examiner*—Patrick J. Ryan
*Assistant Examiner*—Marie R. Macholl
*Attorney, Agent, or Firm*—Michael J. Striker

[57] ABSTRACT

A paper web for producing traymats or coasters, comprising, a highly hygroscopic support paper having two sides, and a sliding-reducing structure applied on at least one side of the support paper. The sliding reducing structure includes a coating applied on at least one side of the support paper, the coating forming a discrete structure on the support paper, being raised above the support paper, and increasing static friction. The coating is composed of an aqueous synthetic plastic dispersion based exclusively on a self-crosslinking acrylate.

9 Claims, 1 Drawing Sheet

PLASTIC COATED PAPER WEB FOR TRAYMATS AND COASTERS

CROSS-REFERENCE TO RELATED APPLICATION

This application is a continuation-in-part of patent application Ser. No. 692,169, filed on Apr. 26, 1991 now abandoned.

BACKGROUND OF THE INVENTION

The present invention relates generally to paper webs. More particularly it relates to paper webs for producing tablecloth, traymats, coasters and the like, composed of a support paper and a coating.

Such paper webs are known, for example, from U.S. Pat. No. 4,277,529.

Webs produced from such coated paper are mainly used when, for example, the objects which due to their surface properties have tendency to ready sliding, must be transported or moved.

In particular, in the gastronomic field utensils produced from such paper webs are utilized, since when needed they are relatively easy to exchange. For preventing sliding of for example glasses on corresponding traymats, coasters or tablecloths, the corresponding par is provided with structured coating to increase the adhesive action. The coating is for example printed by screen, flexo or deep printing and heated.

The manufacture of the paper web specified hereinabove has disadvantages related to costs. The coating, due to its consistency can be applied with low printing speed onto the support paper.

SUMMARY OF THE INVENTION

Accordingly, it is an object of the present invention to provide a paper web of the above mentioned general type which is better to use, less expensive to manufacture and less susceptible to wear.

In keeping with these objects and with others which will become apparent hereinafter, one feature of the present invention resides, briefly stated, in a paper web for producing traymats or coasters, comprising, a highly hygroscopic support paper having two sides, and means for reducing sliding of the support paper, applied on at least one side of the support paper, the sliding reducing means including a coating applied on at least one side of the support paper, the coating forming a discrete structure on the support paper, being raised above the support paper, and increasing static friction, the coating being composed of an aqueous synthetic plastic dispersion based exclusively on a self-crosslinking acrylate.

Due to the utilization of an aqueous synthetic plastic dispersion as adhesive coating, first of all a fast manufacture of the printed coating or partial coating is possible. Thus, the aqueous synthetic plastic dispersion can be applied in rotary printing processes onto the paper which is less expensive as compared with the previously used processes. Also, the resulting costs such as printing costs and the cost of synthetic plastic dispersion are lower than the costs of the material used before.

The adhesive action of the paper web is considerably improved. The adhesive effect is so high that the objects do not slide even in the event of high angle of inclination up to 45°.

The coating in accordance with the present invention is formed as a very soft film due to the fact that the aqueous synthetic plastic dispersion consists exclusively of butylacrylate and methylacrylamide which are defined as a selfcrosslinking acrylate. This soft film has, due to its molecular structure very high adhesive forces which lead to the desired static friction increase. This result cannot be obtained by using aqueous dispersions which produce a relatively smooth and hard surface which does not have the static friction (as represented for example by U.S. Pat. No. 4,277,529).

In accordance with a further important feature of the present invention, the coating is transparent. The support paper of the paper web of the invention serves decorative purposes and for this purpose can be provided with a corresponding print before the application of the coating. When the coating is transparent the print provided on the support paper is visible through the coating. In known solutions, for example in the above cited U.S. patent, the coating is milky and therefore non-transparent. The print on the support paper cannot be seen through it. The prints on the support paper serve not only decorative purposes, but also in many cases advertising purposes as well.

Still another feature of the present invention is that the support paper is composed of an air-laid paper. Such a support paper produces a better application of the coating when compared with the above specified U.S. patent.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
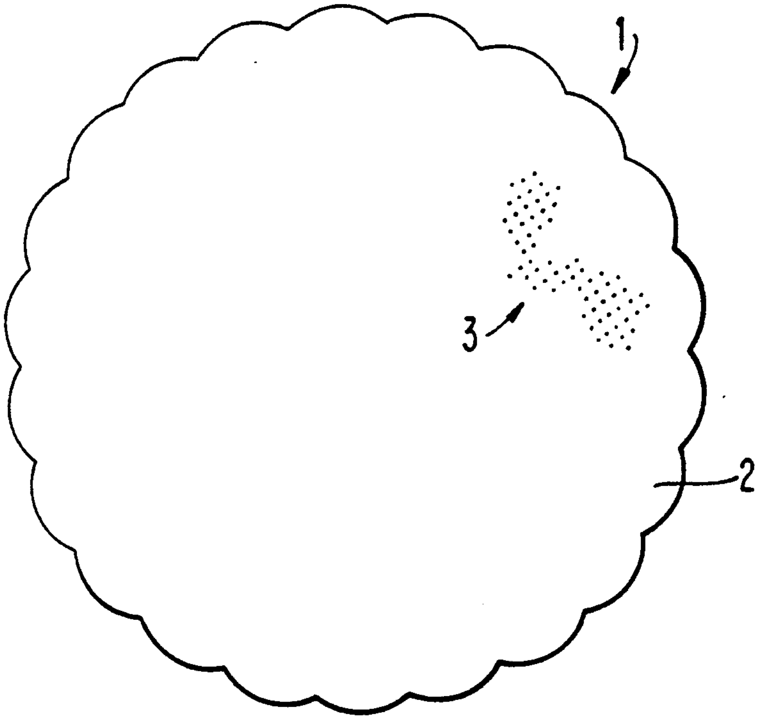
FIG. 1 is an object produced from an inventive paper web on a plan view.
Figure 2:
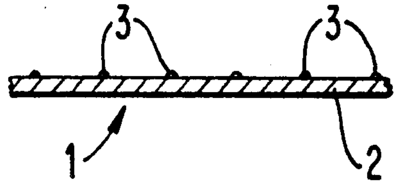
FIG. 2 is a view showing a partial cross-section of the object of FIG. 1.

FIG. 1 shows a paper web 1 in accordance with the present invention, which is formed as a tablecloth or a glass supporting pad. The paper web 1 has a support paper 2 and a structured coating 3 which is arranged on one side of the support paper and increases the adhesive friction.

The support paper 2 is composed of a highly hygroscopic paper, such as for example a filter paper having a great outer surface. It is also possible that the support paper 2 is composed of a plain hygroscopic paper. The coating 3 which is applied in point-like manner so as to form a discrete structure which is raised above the surface of the support paper. The coating 3 is composed of an aqueous synthetic plastic dispersion consisting exclusively of butylacrylate and methylacrylamide which are defined as a selfcrosslinking acrylate. It forms a soft film which, due to its molecular structure, has high adhesion forces, leading to the desired high static friction.

The coating 3 is transparent. Therefore, any prints which are produced for decorative purposes, advertising purposes, etc. on the support paper can be visible through the transparent coating. It is to be understood that the transparent coating can be slightly colored with a single color or with many colors.

The support paper can be formed as an air-laid paper. The air-laid paper substantially differs from a tissue paper since it provides an improved application of the coating 3.

It is shown in the drawings that the coating 3 is applied only on one side of the support paper 2. It is however to be understood that it is also possible, when needed, to apply the coating 3 on the second side of the support paper as well. In any case, the coating 3 has a structure which is determined by corresponding requirements. The coating 3 can be applied only partially or over the whole surface of the support paper.

The thermoplastic synthetic plastic can be applied by a coating device provided with nozzles. In this way different patterns which form the structure can be applied, such as for example discrete garlands, lines or similar shapes.

The synthetic plastic dispersion can be applied in form of latex. The application can be performed as a printed coating or partial coating. Rotary printing processes can be used for this purpose.

The coating can be applied with a doctor blade, partially or over a whole surface. The coating can be transparent. On the other hand, it can be also colored. In the last case the coating can be a single color coating or a multi-color coating.

It will be understood that each of the elements described above, or two or more together, may also find a useful application in other types of constructions differing from the types described above.

While the invention has been illustrated and described as embodied in a paper web, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A paper web for producing traymats or coasters, comprising, a hygroscopic support paper having two sides, and means for reducing sliding of said support paper, applied on at least one side of said support paper, said sliding reducing means including a coating applied on at least one side of said support paper, said coating forming a discrete structure on said support paper, being raised above said support paper, and increasing static friction, said coating consisting of butylacrylate and methylacrylamide.

2. A paper web as defined in claim 1, wherein said support paper is a filter paper.

3. A paper web as defined in claim 1, wherein said coating is applied over a whole surface of said one side of said support paper.

4. A paper web as defined in claim 1, wherein said coating is applied over a portion of said one side of said support paper.

5. A paper web as defined in claim 1, wherein said coating is a transparent coating.

6. A paper web as defined in claim 1, wherein said coating is a colored coating.

7. A paper web as defined in claim 1, wherein said coating is a single-color coating.

8. A paper web as defined in claim 1, wherein said coating is a multi-color coating.

9. A paper web as defined in claim 1, wherein said support paper is an air-laid paper.

* * * * *